United States Patent
Ufheil et al.

(10) Patent No.: US 6,868,988 B2
(45) Date of Patent: Mar. 22, 2005

(54) CONTAINERS OF FLOWABLE SUBSTANCE ADAPTED FOR CONNECTING TO DISPENSING DEVICES OF A BEVERAGE OR FOOD DISPENSING MACHINE

(75) Inventors: Gerhard Ufheil, New Milford, CT (US); Gerald Squires, New Milford, CT (US)

(73) Assignee: Nestec S.A., Vevey (CH)

( * ) Notice: Subject to any disclaimer, the term of this patent is extended or adjusted under 35 U.S.C. 154(b) by 135 days.

(21) Appl. No.: 10/377,231

(22) Filed: Feb. 28, 2003

(65) Prior Publication Data

US 2004/0169051 A1 Sep. 2, 2004

(51) Int. Cl.$^7$ ................................................. B67D 5/56
(52) U.S. Cl. ...................... 222/129.1; 222/325; 222/561
(58) Field of Search ............................ 222/129, 129.1, 222/185.1, 153.09, 325, 561; 215/6

(56) References Cited

U.S. PATENT DOCUMENTS

| | | | | |
|---|---|---|---|---|
| 2,558,522 | A | * 6/1951 | Knapp | 222/2 |
| 5,239,491 | A | * 8/1993 | Mucciacciaro | 364/569 |
| 5,277,337 | A | * 1/1994 | Ford et al. | 222/135 |
| 5,425,404 | A | * 6/1995 | Dyer | 141/351 |
| 5,513,777 | A | * 5/1996 | Yoda et al. | 222/325 |
| 5,593,068 | A | * 1/1997 | Kitayama et al. | 222/167 |
| 5,908,144 | A | * 6/1999 | Dalton | 222/185.12 |
| RE36,324 | E | * 10/1999 | Yoda et al. | 222/325 |
| 6,006,657 | A | * 12/1999 | Ikuta | 99/331 |
| 6,250,506 | B1 | * 6/2001 | Geiger et al. | 222/105 |
| 6,391,360 | B1 | * 5/2002 | Stettes et al. | 426/433 |
| 6,458,269 | B1 | * 10/2002 | Bassett et al. | 210/119 |

FOREIGN PATENT DOCUMENTS

| | | | |
|---|---|---|---|
| DE | 43 23 295 | * | 2/1995 |
| EP | 0 343 090 | * | 11/1989 |
| EP | 0 623 471 A2 | * | 11/1994 |
| EP | 0 895 137 a1 | * | 2/1999 |
| EP | 1 114 724 A2 | * | 7/2001 |
| FR | 2 646 656 | * | 11/1990 |
| GB | 2 182 914 A | * | 5/1987 |
| WO | WO 02/081308 A2 | * | 10/2002 |

\* cited by examiner

*Primary Examiner*—Michael Mar
*Assistant Examiner*—Patrick Buechner
(74) *Attorney, Agent, or Firm*—Winston & Strawn LLP (57) ABSTRACT

The invention discloses a device intended for dispensing first and second flowable substances for the preparation of a food or beverage. This device includes first and second container holders each comprising an apertured plate member for receiving a container opening, with the plate member being adapted to move from a closed position, wherein a portion of the plate member obturates the container opening, to an open position, where the flowable substance can be dispensed from the container, and vice versa. First and second container opening connection structures are provided for operatively associating each container opening with its respective apertured plate member. The first container opening connection structure is configured to be different from the second container opening connection structure so that each can receive and engage only its respective container opening but not the other so that the device can properly receive and dispense the first and second flowable substances when preparing the food or beverage. The invention also relates to a container for holding a flowable substance and for attachment as a reservoir in a top-down position onto a device for dispensing the flowable substance.

17 Claims, 6 Drawing Sheets

CONTAINERS OF FLOWABLE SUBSTANCE ADAPTED FOR CONNECTING TO DISPENSING DEVICES OF A BEVERAGE OR FOOD DISPENSING MACHINE

FIELD OF THE INVENTION

The present invention generally relates to a system for dispensing a flowable substance, and in particular to food containers adapted to be attached to the devices for dispensing a flowable substance used in the preparation of a beverage and/or food such as in a beverage and/or food dispensing machine and the like.

BACKGROUND

PCT publication WO 02/081308 A2 (US 20020145010A1) relates to a device for cleanly and conveniently refilling a flowable substance in a dispensing device. This device comprises a container containing a flowable substance, a holder attached to the container that includes an opening mechanism for securing the opening of the container when the holder is held in a stable delivery position in the reservoir. An unlatching mechanism is also provided to release the container holder from the reservoir in a convenient way. Such a device can advantageously be installed in a beverage and/or food dispensing machine such as a coffee, cocoa and/or milk dispensing machine and the like.

The benefit of such a device is that it enables to offer a clean and convenient way of charging the device with the substance. Furthermore, the device is compact and can fit in the narrow volume of a machine of relatively small footprint such as a tabletop machine. Many devices can be installed in the machine to deliver substances of various types such as soluble coffee, milk powder, cocoa powder or culinary powder. This is considered as a major advantage to be able to offer a larger choice of beverages or prepared foods without it being detrimental to the delivery capacity. The device of publication WO 02/081308 tackles this problem and offers a solution that is both compact, convenient and provides a good delivery capacity.

A first problem is to ensure that charging of the containers in the device is made properly and without risks of confusing as to the location of the containers in the devices. Indeed, when more than one device is installed in a beverage or food dispensing machine, one wants to make sure that the right container is charged onto the right substance delivery and hopper system. Image and reputation of the brand can be at stake, in particular, when the beverage or food served is not the one that the consumer demanded.

A second problem is to have containers that can fit in a reduced footprint of the machine, i.e., in a narrowly designed housing of the machine, while providing a sufficient delivery capacity that is optimized and a substantially full product evacuation (i.e., close to 99% by weight of fill volume).

The present invention satisfies these needs. The present invention is a further improvement to the invention described in patent publication WO02/081308 which resolves the problems of possible confusion when charging containers on more than one flowable substance delivery device. The present invention also provides containers of optimized geometry and size for being able to fit within a reduced machine volume while providing an optimized throw capacity and full product evacuation.

SUMMARY OF THE INVENTION

The present invention relates to a food container assembly adapted to be releasably attached to a device for dispensing a flowable substance of the type comprising first and second container holders. The container holder is of the type described in WO 02/081308 and comprises an apertured plate member for selectively opening the container, with the plate member being adapted to move from a closed position, wherein a portion of the plate member obturates the container, to an open position, and vice versa, wherein the first and second holders are adapted to engage respectively a first and second hoppers for delivering the powder substance from the containers.

In particular, the device is intended for dispensing first and second flowable substances for the preparation of a food or beverage. This device includes first and second container holders each comprising an apertured plate member for receiving a container opening, with the plate member being adapted to move from a closed position, wherein a portion of the plate member obturates the container opening, to an open position, where the flowable substance can be dispensed from the container, and vice versa. In this device, the improvement comprises providing first and second container opening connection means for operatively associating each container opening with its respective apertured plate member, wherein the first container opening connection means is configured to be different from the second container opening connection means so that each can receive and engage only its respective container opening but not the other so that the device can properly receive and dispense the first and second flowable substances when preparing the food or beverage.

Preferably, each container opening connection means comprises a receiving structure in the apertured plate member and a connecting structure associated with the container opening, wherein the connecting structure of the first container connecting member is arranged to be angularly offset with respect to that of the second container. The connecting structures of the first and second containers may be screw threads or bayonet type or ramp type connectors. Also, the connecting structures are preferably sized to provide a fully tight connecting arrangement between the container holders and container openings after no more than a 360-degree rotation between each container opening and its respective holder.

The first and second containers may have the general shape of an elongated funnel and wherein the connection means are arranged so that the first and second containers connect in a longitudinally aligned configuration respectively with the apertured plates of the first and second holders. Advantageously, the first and second containers are configured to sit side by side in parallel in the device.

The invention also relates to a container for holding a flowable substance and for attachment as a reservoir in a top-down position onto a device for dispensing the flowable substance. The device is of the type described above, which includes a container holder having an apertured plate member for selectively receiving the container opening, with the plate member being adapted to move from a closed position, wherein a portion of the plate member obturates the container opening, to an open position, where the flowable substance can be dispensed and vice versa.

The container advantageously includes a structure for connecting to the apertured plate member of the container holder extending about an opening of central axis O; a body part having an elongated shaped base with a longitudinal maximal dimension L and a transversal maximal dimension T; and a funnelled portion merging both with the connecting part and base. In a preferred arrangement of this structure, the connecting and body parts form a total height H; the ratio L to T is comprised between 1.5:1 to 2.2:1; the ratio L to H is comprised between 1:1 to 1.75:1; the funnelled portion represents at least 40% of the total height H; and the funnelled portion is inclined with respect to the central axis O of the container, at the most distant line of the central axis, by an angle A of between 30 to 60 degrees. In a more preferred arrangement, the ratio L to T is between 1.60:1 to 2:1; the ratio L to H is between 1.12:1 to 1.45:1; the funnelled portion represents at least 50% of the total height H; and the funnelled portion is inclined by an angle A of between 35 to 45 degrees.

The invention also relates to a combination comprising the device described herein and first and second containers each holding a different flowable substance for preparing a food or beverage wherein the device can selectively dispense the flowable substances to prepare the food or beverage.

The invention further relates to a combination comprising two food containers as disclosed herein, each holding a different flowable substance for preparing a food or beverage, and a device for selectively dispensing the flowable substances from the containers

BRIEF DESCRIPTION OF THE DRAWING FIGURES

Preferred features of the present invention are disclosed in the accompanying drawings, wherein similar references characters denote similar elements throughout the several views, and wherein.

DETAILED DESCRIPTION OF THE PREFERRED EMBODIMENTS

According to a first improvement of the present invention, the container assembly comprises first and second containers that connect to the holders by connection means and wherein the connection means of the first and second containers are arranged so as to be angularly offset one respective to the other. As a result of this differentiated connection arrangement from one container respective to the other container, a same container does not identically connect to the different holders, in particular, a same container can misalign with respect to their intended position in the beverage and/or food dispensing machine when a try is made to connect it to the holder which it is not the one intended for. This misalignment can prevent the containers from being loaded in the machine and therefore indicate to the operator that there is an error or confusion.

Preferably, the connection means of the first and second containers can be screw threads, or a bayonet or ramp type connections. Those connections are usually conventional ones that add to the simplicity of the system and reduce the costs. In addition, these connections can easily and economically be configured in the offset relationship, for instance, at 90-degree offset, for the intended purpose.

In a possible mode, the connection means are sized to provide a fully tight connecting arrangement of the containers with the holders after no more than one 360-degree rotation when the containers are engaged with their respective receiving connection means of the holders. This has for advantage to ensure that the containers cannot be partially or loosely connected to a holder that is not the intended one and that the angular offset configuration foreseen is really effective.

In a preferred embodiment, the first and second containers have the general shape of an elongated funnel. The connections means are also arranged so that the first and second containers connect in a longitudinally aligned configuration respectively with the first and second holders. As a result, the containers can be arranged on their respective delivery device, within the beverage and/or food machine, in a predetermined orientation, for instance, in parallel, which has the benefit to optimize the reduction of the footprint of the machine versus the delivery capacity of the substance in the machine. It has also the effect that the containers are not interchangeable with the holders by virtue of the angularly offset connection means, thereby ensuring that the right container fits onto the right holder.

For making the connection obvious, the hoppers, holders, containers can be identified by any suitable common identification means such as by color codes or names or other equivalent systems so that the operator can immediately pick up which containers goes on which holder and which container/holder assembly goes on which hopper in the machine. For additional security, the hoppers 60 and holders 21, 31 can also be sized differently so that one holder can only fit one hopper. This would ensure that the operator can not unintentionally invert the holders in the machines once the containers are properly assembled with them.

In a second aspect of the invention, a food container is provided that is adapted in geometry and dimensions to serve as a compact and efficient reservoir in the food and/or beverage machine. The container of the invention is designed both to offer an optimum of filling volume in a reduced space and to ensure the delivery of a food substance through the dispensing devices at or close to full completion; i.e., at least 98%, preferably 99 to 100% by weight of the fill volume.

For that the food container is configured to be attached as a reservoir in a top-down position onto the device for dispensing the flowable substance, with the container having the structure disclosed herein.

Figure 1:
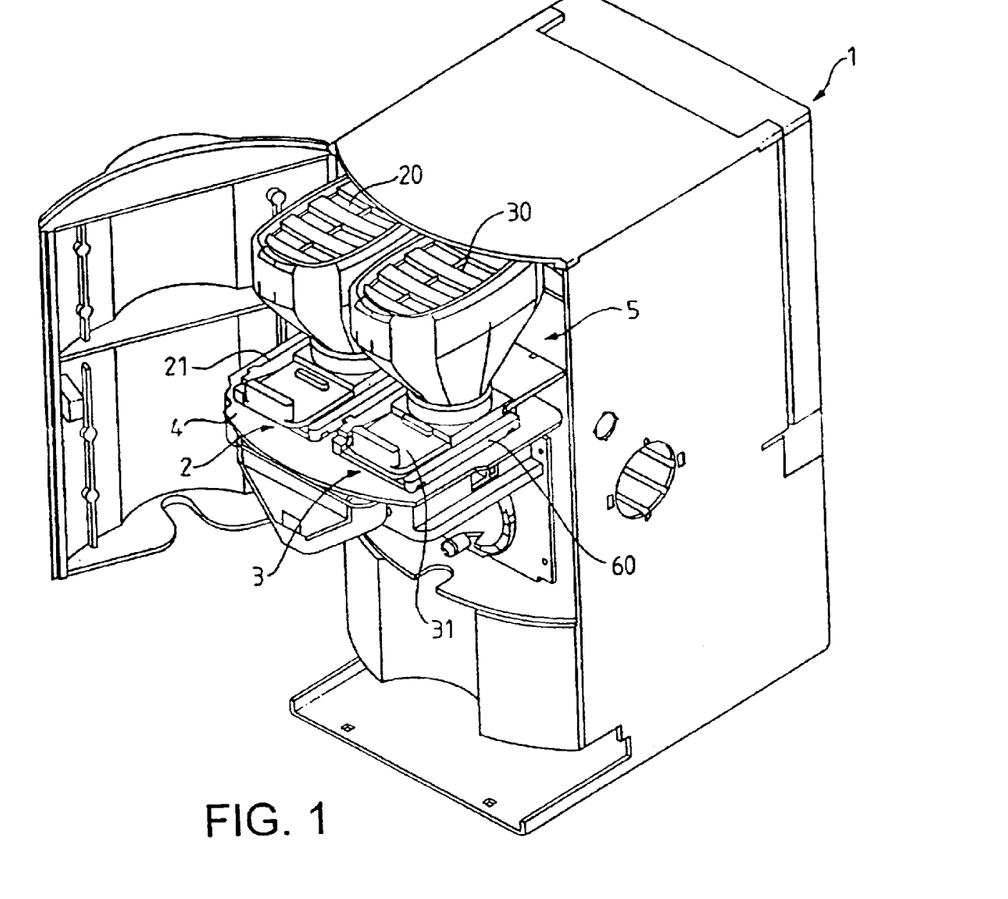
FIG. 1 is a perspective overall view of a beverage and/or food dispensing machine that integrates a pair of flowable substance delivery devices with a pair of containers adapted to these devices.

Referring to FIG. 1, a beverage-making machine 1 is shown that incorporates a pair of dispensing devices of the invention. The machine 1 includes the first dispensing devices 2 and second dispensing device 3 as secured on a support plate 4 of the machine. For reasons of clarity, the support plate has been disengaged from the housing 5 of the machine to show the two devices with their respective first and second containers 20, 30 mounted thereon, but in normal conditions, the plate 4 is fixedly placed in the machine.

Figure 2:
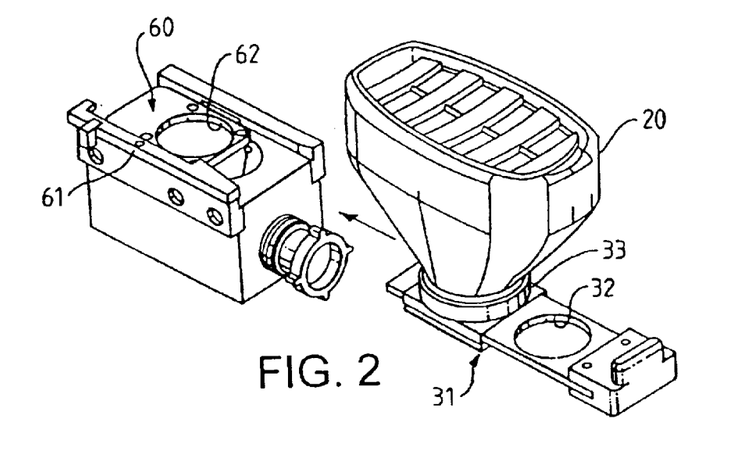
FIG. 2 is a perspective view of one delivery device with a container attached thereto.

FIG. 2 illustrates the device 2 in greater details. Apart from its connection means, device 3 has similar parts and does not need additional description. The device comprises a hopper 60 intended to be fixed thought the support plate 4 in the machine, a plate holder 31 adapted to receive the container and which co-acts with the hopper 60 in sliding relationship for charging the container and its holder into the machine. The container holder 31 comprises an apertured plate member 32 for selectively opening the container 20, with the plate being adapted to move from a closed position wherein the plate member obturates the container to an open position. The plate member may additionally comprise locking means configured for operative association with release means 61 of the hopper and is arranged so that release of the opening means from the locking means is effected only when the container holder is held in a stable position for delivering the flowable food substance through a hole 62 in the hopper 60.

The patent publication WO 02/081308 provides all and every details of the device for dispensing the flowable substance including all possible variants of the hopper and the plate holder device. The content of this patent publication is incorporated herewith by reference.

In the present invention, one improvement that is brought to the prior art publication is that the first and second containers 2, 3 are configured with connection means to be attached to a connection collar 33 of the plate holders that differ angularly one relative to the other.

Figure 3:
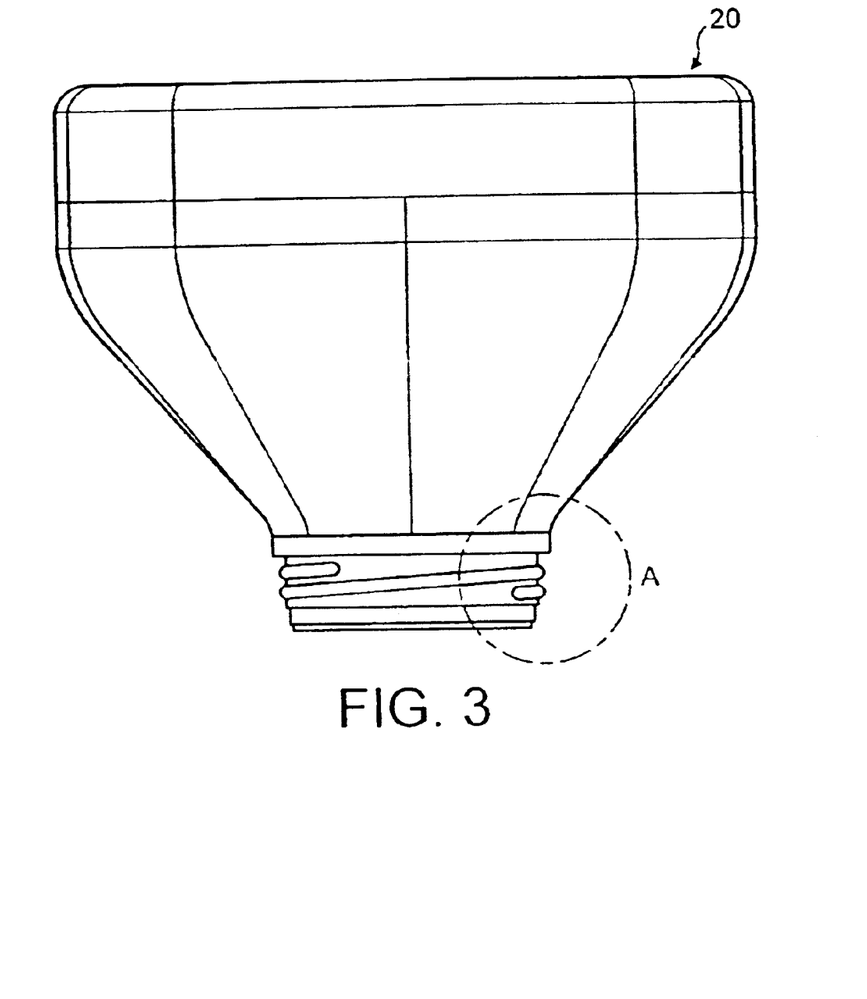
FIG. 3 is a side view of a first container shown in a top-down dispensing position.
Figure 3A:
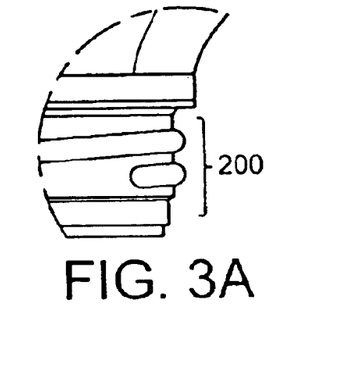
FIG. 3A is a detail view of the threading of the first container.
Figure 4:
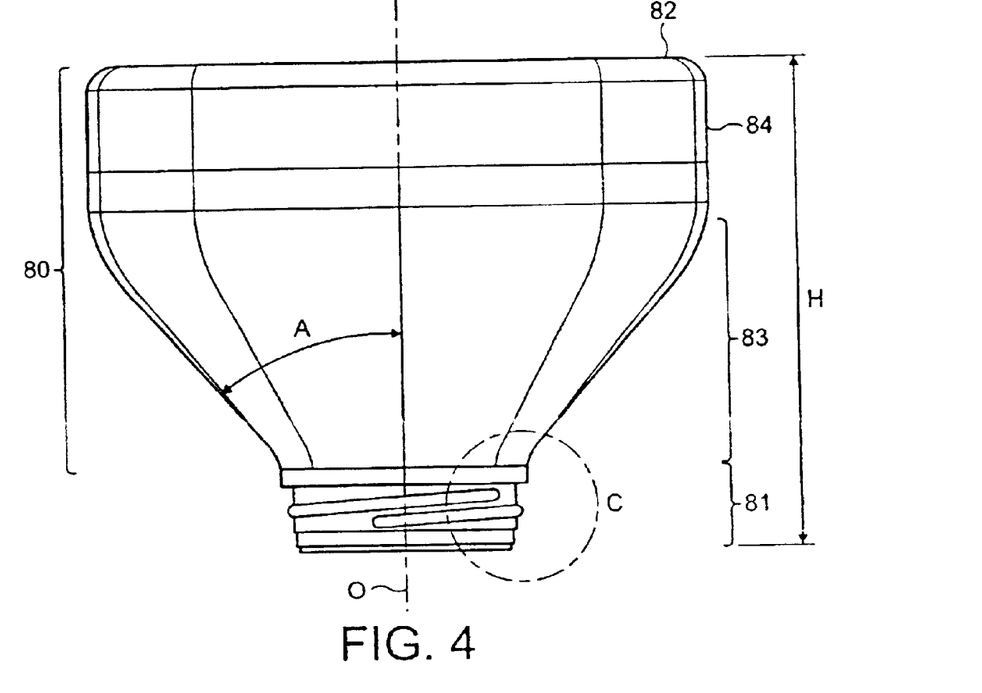
FIG. 4 is a side view of a second container shown in top-down dispensing position.
Figure 4A:
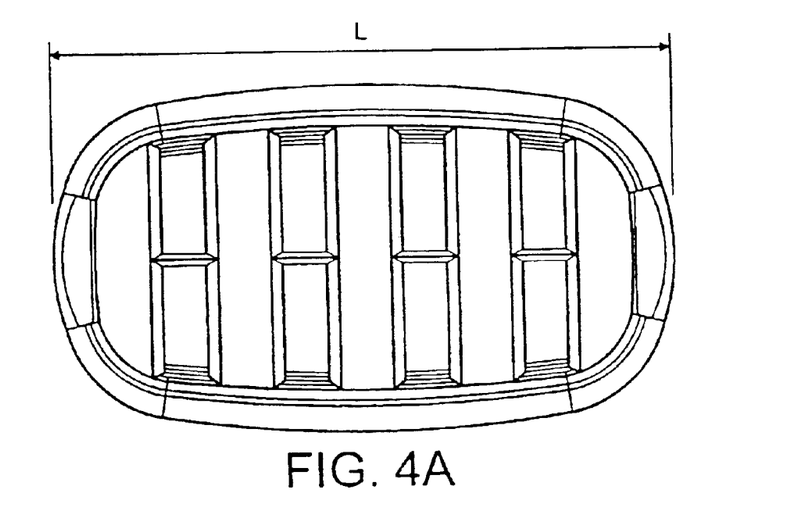
FIG. 4A is a bottom view of the container of FIG. 4.
Figure 4B:
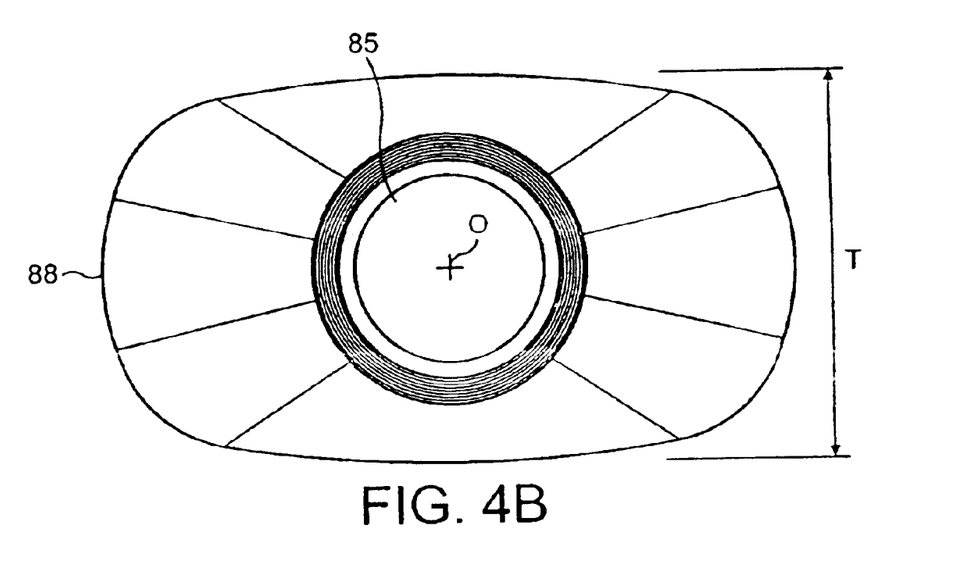
FIG. 4B is a top view of the container of FIG. 4.
Figure 4C:
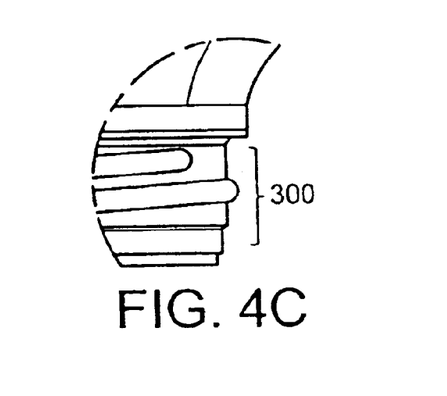
FIG. 4C is a detail view of the threading of the second container.

FIGS. 3 and 3A shows the first container 20 with a short threaded neck portion 200. FIGS. 4 and 4C shows the second container 30 with a short threaded neck portion 300 which is offset at 90 degrees as compared to the threaded neck portion 20 of the first container. It is intended that the plate holder has complementary threaded receiving portions that co-acts with the containers in such a manner that the first container 20 connects onto the first device 2 in the alignment configuration relative to the housing and that the second container 30 connects onto the second device 3 in the alignment configuration relative to the housing, as illustrated in FIG. 1. Therefore, by virtue of the offset connecting arrangement, the first and second containers will sit aligned in the housing of the machine only if the right container is connected to the right holder. On the contrary, if one attempts to make the screw fitting between the first container 20 onto the second holder 31 or, of the second container 3 onto the first holder 21, it will result a misalignment of the containers with respect to the holders due to the fact that upon tight screwing of the containers on the holders, the containers will stand at right angle with respect to the longitudinal direction of the holders. As a result, it will no more be possible to insert the holders and their containers onto the hoppers within the housing of the machine.

Preferably, the threaded portions 200, 300 of the containers are made very short, for instance, such that no more than one turn is necessary to create a fully tight connection with the holders. As a result, it can not be possible to loosely connect the containers on the holders since it would otherwise be possible to realign the containers with respect to the holder in this loose connecting configuration and which is not desirable.

Figure 5:
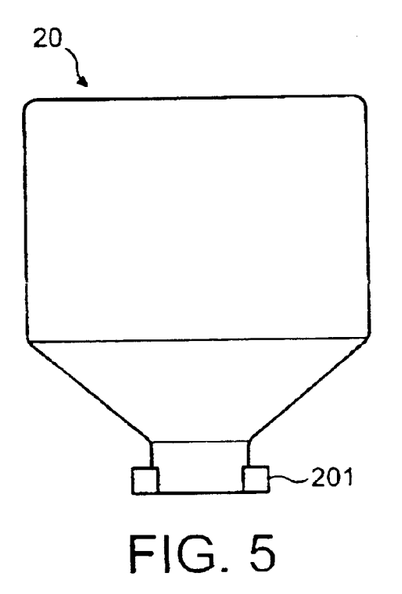
FIG. 5 is a schematic side view of a variant of the first container with a ¼-turn bayonet type connection type.
Figure 5A:
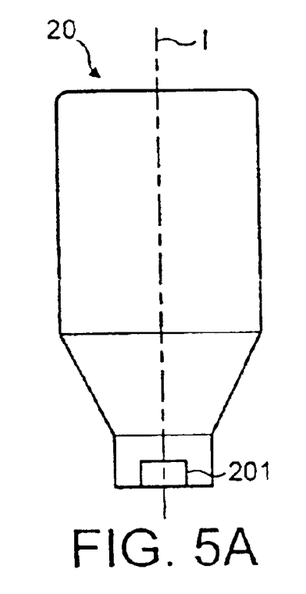
FIG. 5A is a schematic front view of the first container of FIG. 5.
Figure 5B:
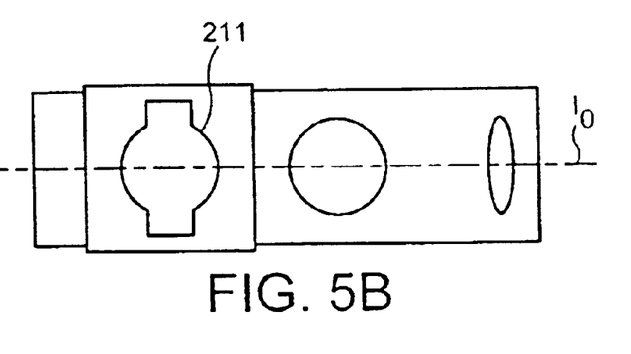
FIG. 5B is a schematic top view of the plate holder for receiving the first container of FIGS. 5 and 5A.
Figure 6:
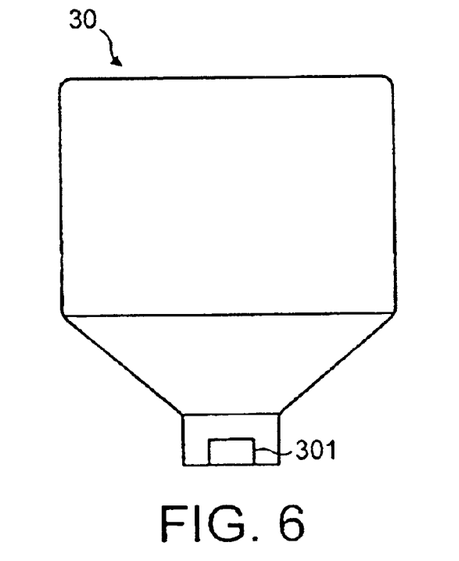
FIG. 6 is a schematic side view of a variant of the second container.
Figure 6A:
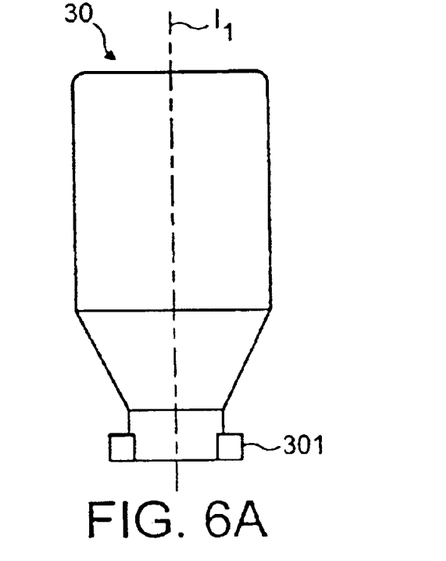
FIG. 6A is a schematic front view of the second container of FIG. 6.
Figure 6B:
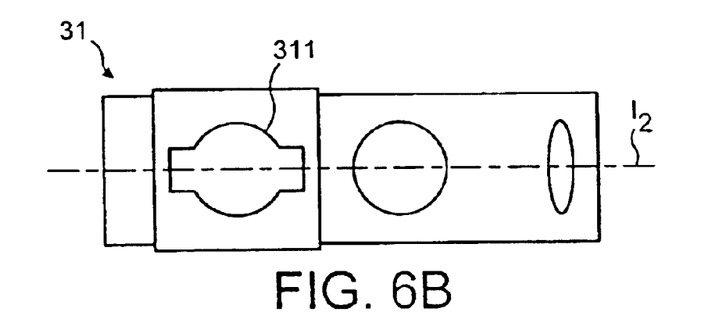
FIG. 6B is a schematic top view of the plate holder for receiving the second container of FIGS. 6 and 6A.

FIGS. 5, 5A, 5B, 6, 6A, 6B illustrate another embodiment of the invention in which the connections are of the bayonet type. The container 20 of FIGS. 5 and 5A is configured with positive protruding portions 201 that fit in recessed portions 211 of a ramp type connection of the holder 21 of FIG. 5B. The protruding and recessed portions 201, 211 are such oriented that upon engaging the container 20 in connection, the tight fitting is carried out at about ¼ of a turn of rotational motion and it results in the container being aligned with the holder, i.e., its longitudinal axis I substantially aligned with axis $I_0$ of the holder. Similarly, the second container 30 of FIGS. 6 and 6A has a protruding portions 301 substantially offset at 90 degrees with respect to the portions 201 of the first container and they co-act with recessed portions 311 of the second holder 31. It also results in an alignment of the container longitudinal axis $I_1$ with the holder's longitudinal axis $I_2$ upon connecting the two pieces at about ¼ of a turn.

It can be noticed that if the two containers 20, 30 are inverted, it results in a misalignment of the containers on the holders and it would not be possible to engage the holders onto the hoppers in the machine.

Back to FIGS. 4 to 4C, the containers of the inventions are particularly designed to offer an optimized filling capacity within a reduced space in the machine and a full product evacuation feature. For that, the containers comprises a body part 80 and a connection part 81 that form a height H. The connection part demarcates the outlet 85 of the container at which a central axis O can be defined. The body part 80 has an elongated shape such as, preferably, an oval shape or oblong shape, with a flat base 82 forming the bottom of the container and a funnelled portion 83 that extends from a portion 84 of the base 82. The base of the container has a maximal longitudinal dimension, L, as shown in FIG. 4A and has a maximal transverse dimension, T, as shown in FIG. 4B. The funnelled portion 83 forms a zone of progressively reduced section that merges the base portion 84, at one end, and the connection part 81, at its other end. The funnelled portion thus forms an angle of inclination with respect to the central axis O of the outlet.

The container of the invention is therefore designed so that the ratio L to T is preferably comprised between 1.5:1 to 2.2:1, preferably 1.60:1 to 2:1; even most preferably 1.65 to 1.85; the ratio L to H is comprised between 1:1 to 1.75:1; preferably 1.12:1 to 1.45:1; the funnelled portion 83 represents at least 40% of the total height H, preferably at least 50%, most preferably between 55 to 90%; and the funnelled portion 83 is inclined with respect to the central axis O of the container, at the most distant line 88 from the axis O, as shown in FIG. 4B, an angle A of between 30 to 60 degrees, preferably 35 to 45, most preferably of about 39 to 42 degrees.

It has been found, in particular, that lower ratio L:T, i.e., closer to 1:1, would be detrimental to the serving capacity of the container. On the contrary higher ratio L:T would cause flowing problems by impacting on angle A becoming too high. Similarly, higher ratio L:H, e.g., 0.5:1 or less, would be also detrimental to the serving capacity or would typically make the machine too high. The relative proportion of the funnelled portion with respect to the rest of the container also proved to be critical to ensure the right funnelling angle but, at the same time, determined without being detrimental to the serving capacity.

The packaging can either be made as a monolayer with a good humidity barrier or as a multi-layer with both a good humidity and a good oxygen barrier. The oxygen barrier is requested especially when powders with milk fat is used. Skim milk powders is usually not filled with nitrogen flush and therefore the multi-layer is usually not really requested. Before use, the containers are closed by a cap that fits the connection part 81. The outlet may further be sealed by a tamper evidence aluminum sealing film.

For countertop beverage machines' applications, the containers may have a capacity of about 350 to 1000 mL, preferably about 550 mL, and can be filled with approximately 190–250 grams of agglomerated skim milk powder, or 230–300 grams of non-agglomerated spray dried skim milk powder. Depending upon the desired dilution ratio and type of milk powder, the number of servings may be of from 25 to 50 servings. For example, it was possible to install two 550-mL containers in the machine of FIG. 1 while the surface area occupied by the two containers being of less than 300 cm² (each container occupying in fact about 110 cm² each) with a serving capacity of about 70–80 servings at about 7 grams per serving. The containers had an evacuation rate of about 99%. The containers were also low in height and did not exceed 105 mm. The containers were fitting on a dosing and hopper system that did not exceed 45 mm in height, to hold only a 5 to 20% fraction of the containers' total volume.

The dimensions of the beverage machine of FIG. 1 were:

|  | in cm |
|---|---|
| Overall machine dimensions: | |
| Width | 20 (drip tray out) |
| Depth | 27 |
| Height | 40 |
| Height composed: | |
| Container | 10.5 |
| Hopper | 4.5 (fitment and hopper tray) |
| Mixer | 10 (from outlet to the rim of funnel) |
| Free distance for powder to drop | 2.5 to 3.0 (distance to funnel rim to screw) |
| Free cup height | 9.5 |
| Tray height | 2.0 |

The container design will allow the operating system where the product packaging serves as a reservoir in the dispensing machine. The container will empty completely and no left over of product will spill during recharge. As a consequence, always fresh product with almost no cross-contamination with aged product will be dispensed through the device.

The terms "powder" refers to any sort of solid flowable material such as powder, particulates, granules, grains, seeds, chips, flakes and combinations thereof of any flowable particle size.

The term "food" is used herein to mean food or beverage ingredients or combinations thereof.

The invention described and claimed herein is not strictly limited in scope by the specific embodiments herein disclosed. Any equivalent embodiments are intended to be within the scope of this invention. Indeed, various modifications of the invention will become apparent to those skilled in the art from the foregoing description. Such modifications are also intended to fall within the scope of the appended claims.

What is claimed is:

1. In a device for dispensing first and second flowable substances for the preparation of a food or beverage, the device including first and second container holders each comprising an apertured plate member for receiving a container opening, with the plate member being adapted to move from a closed position, wherein a portion of the plate member obturates the container opening, to an open position, where the flowable substance can be dispensed from the container, and vice versa, the improvement which comprises providing first and second container opening connection means for operatively associating each container opening with its respective apertured plate member, wherein the first container opening connection means is configured to be different from the second container opening connection means so that each can receive and engage only its respective container opening but not the other so that the device can properly receive and dispense the first and second flowable substances when preparing the food or beverage.

2. The device of claim 1 wherein each container opening connection means comprises a receiving structure in the apertured plate member and a connecting structure associated with the container opening, wherein the connecting structure of the first container connecting member is arranged to be angularly offset with respect to that of the second container.

3. The device of claim 2, wherein the connecting structures of the first and second containers are screw threads or bayonet type or ramp type connectors.

4. The device of claim 3, wherein the connecting structures are sized to provide a fully tight connecting arrangement between the container holders and container openings after no more than a 360-degree rotation between each container opening and its respective holder.

5. The device of claim 1, wherein the first and second containers have the general shape of an elongated funnel and wherein the connection means are arranged so that the first and second containers connect in a longitudinally aligned configuration respectively with the apertured plates of the first and second holders.

6. The device of claim 5, wherein the first and second containers are configured to sit side by side in parallel in the device.

7. A combination comprising the device of claim 1 and first and second containers each holding a different flowable substance for preparing a food or beverage wherein the device can selectively dispense the flowable substances.

8. The combination of claim 7, wherein at least one container comprises:

a structure for connecting to the apertured plate member of the container holder extending about an opening of central axis O;

a body part having an elongated shaped base with a longitudinal maximal dimension L and a transversal maximal dimension T; and a funnelled portion merging both with the connecting part and base; wherein:

the connecting and body parts form a total height H;

the ratio L to T is comprised between 1.5:1 to 2.2:1;

the ratio L to H is comprised between 1:1 to 1.75:1;

the funnelled portion represents at least 40% of the total height H; and the funnelled portion is inclined with respect to the central axis O of the container, at the most distant line of the central axis, by an angle A of between 30 to 60 degrees.

9. The combination of claim 8 wherein in the food container:

the ratio L to T is between 1.60:1 to 2:1;

the ratio L to H is between 1.12:1 to 1.45:1;

the funnelled portion represents at least 50% of the total height H; and the funnelled portion is inclined by an angle A of between 35 to 45 degrees.

10. The combination of claim 7, wherein each container comprises:

a structure for connecting to the apertured plate member of the container holder extending about an opening of central axis O;

a body part having an elongated shaped base with a longitudinal maximal dimension L and a transversal maximal dimension T; and a funnelled portion merging both with the connecting part and base; wherein:

the connecting and body parts form a total height H;

the ratio L to T is comprised between 1.5:1 to 2.2:1;

the ratio L to H is comprised between 1:1 to 1.75:1;

the funnelled portion represents at least 40% of the total height H; and the funnelled portion is inclined with respect to the central axis O of the container, at the most distant line of the central axis, by an angle A of between 30 to 60 degrees.

11. The combination of claim 10 wherein, in each food container:

the ratio L to T is between 1.60:1 to 2:1;

the ratio L to H is between 1.12:1 to 1.45:1;

the funnelled portion represents at least 50% of the total height H; and the funnelled portion is inclined by an angle A of between 35 to 45 degrees.

12. The device of claim 1, wherein at least one container comprises:

a structure for connecting to the apertured plate member of the container holder extending about an opening of central axis O;

body part having an elongated shaped base with a longitudinal maximal dimension L and a transversal maximal dimension T; and a funnelled portion merging both with the connecting part and base; wherein:

the connecting and body parts form a total height H;

the ratio L to T is comprised between 1.5:1 to 2.2:1;

the ratio L to H is comprised between 1:1 to 1.75:1;

the funnelled portion represents at least 40% of the total height H; and the funnelled portion is inclined with respect to the central axis O of the container, at the most distant line of the central axis, by an angle A of between 30 to 60 degrees.

13. The device of claim 12 wherein, in the food container:

the ratio L to T is between 1.60:1 to 2:1;

the ratio L to H is between 1.12:1 to 1.45:1;

the funnelled portion represents at least 50% of the total height H; and the funnelled portion is inclined by an angle A of between 35 to 45 degrees.

14. The device of claim 1, wherein each container comprises:

a structure for connecting to the apertured plate member of the container holder extending about an opening of central axis O;

a body part having an elongated shaped base with a longitudinal maximal dimension L and a transversal maximal dimension T; and a funnelled portion merging both with the connecting part and base; wherein:

the connecting and body parts form a total height H;

the ratio L to T is comprised between 1.5:1 to 2.2:1;

the ratio L to H is comprised between 1:1 to 1.75:1;

the funnelled portion represents at least 40% of the total height H; and the funnelled portion is inclined with respect to the central axis O of the container, at the most distant line of the central axis, by an angle A of between 30 to 60 degrees.

15. The device of claim 14 wherein, in each food container:

the ratio L to T is between 1.60:1 to 2:1;

the ratio L to H is between 1.12:1 to 1.45:1;

the funnelled portion represents at least 50% of the total height H; and the funnelled portion is inclined by an angle A of between 35 to 45 degrees.

16. The device of claim 15 wherein each food container holds a different flowable substance for preparing a food or beverage.

17. The device of claim 1 wherein each food container holds a different flowable substance for preparing a food or beverage.

* * * * *